Dec. 23, 1952      L. P. DURST      2,622,681
TAPE DISPENSER Filed March 17, 1947      5 Sheets—Sheet 1

INVENTOR.
*Lester P. Durst*

ATTORNEYS

Dec. 23, 1952          L. P. DURST          2,622,681

TAPE DISPENSER

Filed March 17, 1947          5 Sheets-Sheet 2

INVENTOR.

Lester P. Durst

ATTORNEYS

Dec. 23, 1952　　　　　　　　L. P. DURST　　　　　　　2,622,681
TAPE DISPENSER

Filed March 17, 1947　　　　　　　　　　　　5 Sheets-Sheet 3

INVENTOR.
Lester P. Durst
ATTORNEYS

Dec. 23, 1952            L. P. DURST           2,622,681
TAPE DISPENSER

Filed March 17, 1947                                          5 Sheets-Sheet 4

INVENTOR.
Lester P. Durst
BY
ATTORNEYS

Dec. 23, 1952 L. P. DURST 2,622,681
TAPE DISPENSER
Filed March 17, 1947 5 Sheets-Sheet 5

INVENTOR.
Lester P. Durst
BY
ATTORNEYS

Patented Dec. 23, 1952

2,622,681

UNITED STATES PATENT OFFICE 2,622,681

TAPE DISPENSER

Lester P. Durst, Beverly Hills, Calif.

Application March 17, 1947, Serial No. 735,179

6 Claims. (Cl. 164—41)

The present invention relates generally to a tape dispenser, and more particularly to a machine for dispensing strips of predetermined length from a continuous roll of tape.

The machine in accordance with the present invention is intended primarily for use in dispensing strips of adhesive tape of the normally tacky or pressure-sensitive type usually comprising a paper, cloth, or cellulosic backing coated on one side with a highly cohesive material, the adhesive character of which is not dependent upon prior conditioning by the employment of heat or a solvent. However, it will be apparent to one skilled in the art that my improved dispenser may also be advantageously employed in dispensing measured strips from rolls of other types of material, such as for example, ordinary gummed paper which must be moistened to render it adhesive prior to its application for the wrapping of packages or the like.

The principal object of the present invention is to provide a dispenser of the type described which may be entirely manually operated and wherein the tape measuring mechanism may be easily and rapidly adjusted for the dispensing of strips of various lengths.

Another object of the invention is to provide a machine for dispensing measured strips from a continuous roll of tape having a tape shearing device which may be manually set in cocked position and which is operatively associated with the tape measuring mechanism for automatic operation at the precise point desired.

A further object of the invention is to provide a tape dispenser of the type described wherein the tape measuring mechanism may be set into various positions of adjustment at any time, either before or after cocking the shear mechanism.

An additional object of the invention is to provide a tape guiding assembly for a dispenser of the type described having tape contacting surfaces curved in such manner as to impart a temporary transverse curvature to the tape tending to hold the latter erect and adding rigidity thereto to improve the shearing operation.

An important object of the invention is to provide a tape dispenser of the type described having improved guard devices associated with the tape shearing mechanism which are automatic and double-acting to prevent accidental injury to the operator of the machine.

Yet another object of the invention is to provide a tape dispenser of the type described employing a compartmented construction wherein the major portion of the dispensing mechanism is separated from the roll of tape in such manner that a new tape roll may be easily and quickly installed and will be largely protected against dirt, tearing and undue drying out.

Additional objects of the invention are to provide a tape dispenser of the type described wherein the tape can feed in only one direction and thus cannot backlash or cause substantial error in the shearing operation in the event the manual pull on the tape should be temporarily interrupted; to provide serrated structure at the regions of contact between the adhesive portions of the tape and the feeding apparatus to prevent undue sticking; and to provide a notched tape supporting structure at the outlet of the machine so that the tape may be readily grasped by the operator to initiate a dispensing operation.

Other objects and advantages of the invention will become apparent during the course of the following description.

In the drawings I have shown one embodiment of the invention. In this showing.

Figure 4:
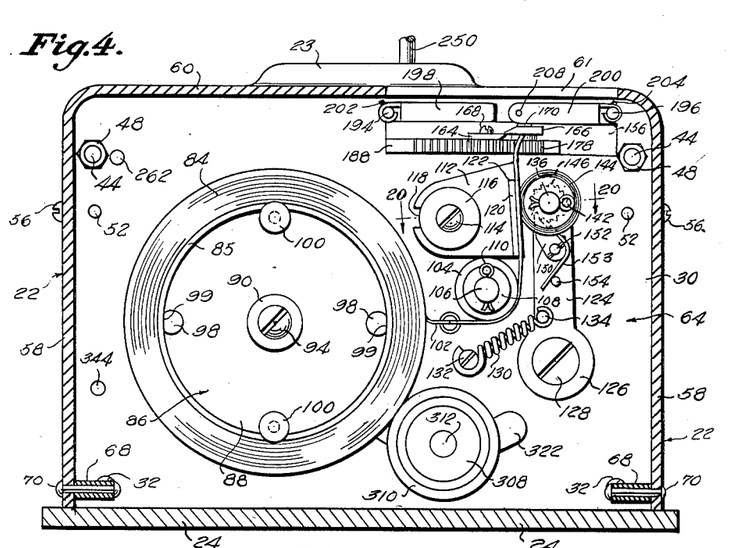
Fig. 4 is a longitudinal cross-sectional view through the machine taken substantially along the line 4—4 of Fig. 1.
Figure 5:
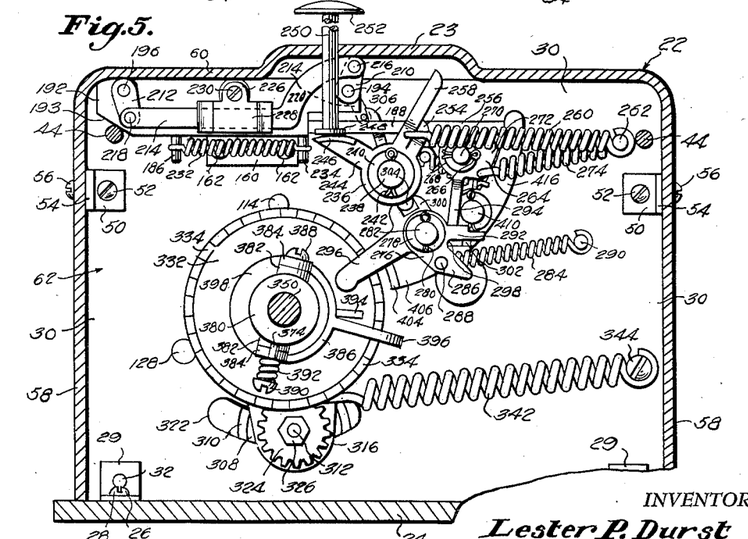
Fig. 5 is a longitudinal cross-sectional view similar to Fig. 4 but taken along the line 5—5 of Fig. 1.
Figure 6:
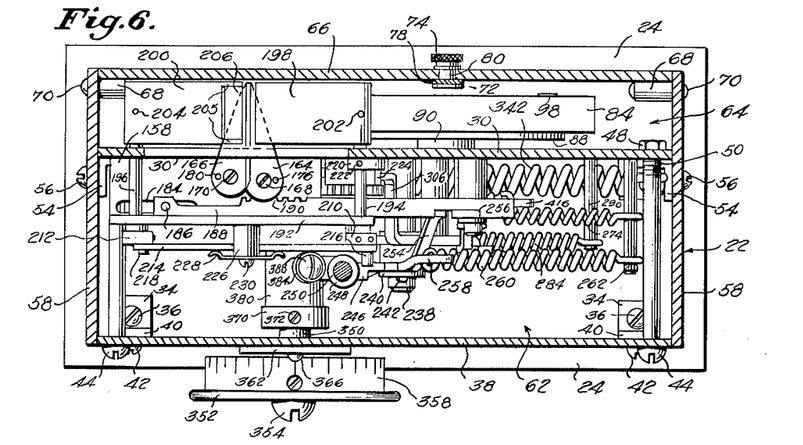
Fig. 6 is a transverse cross-sectional view of the machine taken in a horizontal plane along the line 6—6 of Fig. 2.
Figure 7:
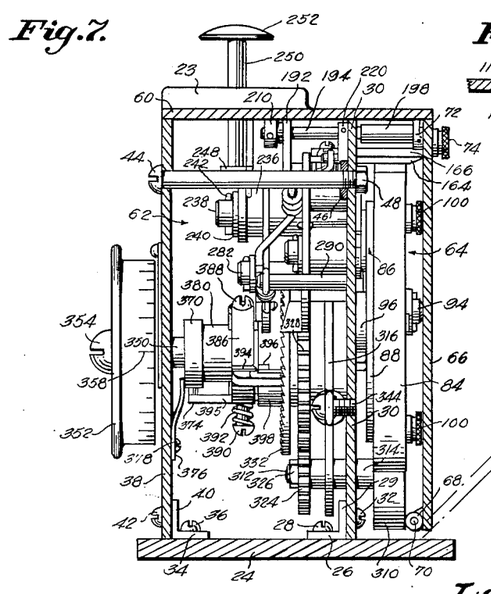
Fig. 7 is a transverse cross-sectional view of the machine taken in a vertical plane along the line 7—7 of Fig. 1.

Referring now in more detail to the various figures of the drawing and in particular to Figs. 1 to 7 thereof, the improved tape dispensing machine in accordance with the present invention is seen to comprise a substantially closed rectangular housing designated generally by reference numeral 22 mounted upon a flat rectangular base 24. As best illustrated in Figs. 5 and 7 the base 24 is provided with a pair of angle brackets having horizontal faces 26 secured thereto as by means of suitable screws 28 and serving to support a longitudinally extending inner vertical wall or partition 30 attached to the vertical faces 29 of the brackets as by means of suitable screws 32. A similar pair of angle brackets having their horizontal faces 34 secured to the base 24 as by means of the screws 36 serves to support one of the outer vertical side walls 38 of the housing which is attached to vertical bracket faces 40 as by means of the screws 42. Adjacent their upper portions the side wall 38 and inner wall 30 are suitably drilled to receive a pair of through bolts 44 held in place as by means of washers 46 and lock nuts 48.

Referring again particularly to Figs. 5 and 6, the inner vertical wall or partition 30 is provided at its upper portion with a pair of angle brackets similar to those described above and having one face 50 attached thereto as by means of suitable screws 52. The other faces 54 of these brackets are adapted to be secured as by means of screws 56 to a suitably bent strip preferably of metal which constitutes the end walls 58 and top 60 of the housing 22.

The space enclosed within the inner wall 30, the outer wall 38, the base 24, the ends 58 and top 60 constitutes a compartment designated generally by reference numeral 62 which serves to house a majority of the various operating elements of the dispenser mechanism. A second compartment designated generally by reference numeral 64 of somewhat smaller dimensions is enclosed between the base 24, end walls 58, top 60, inner wall 30 and a movable closure 66 constituting the other outer side wall of the housing 22. The closure 66 is pivoted at its lower end as by means of bushings 68 to pivot pins 70 mounted in the end walls 58 and is provided at its top portion with latch means in the form of a cutaway bolt 72 rotatably mounted within the closure 66. A knurled operating handle 74 is adapted to rotate the projection 76 upon the bolt into or out of engagement with a lug 78 attached to the top 60 of the housing.

Figures 8, 9, 10, 11, 18, 19:
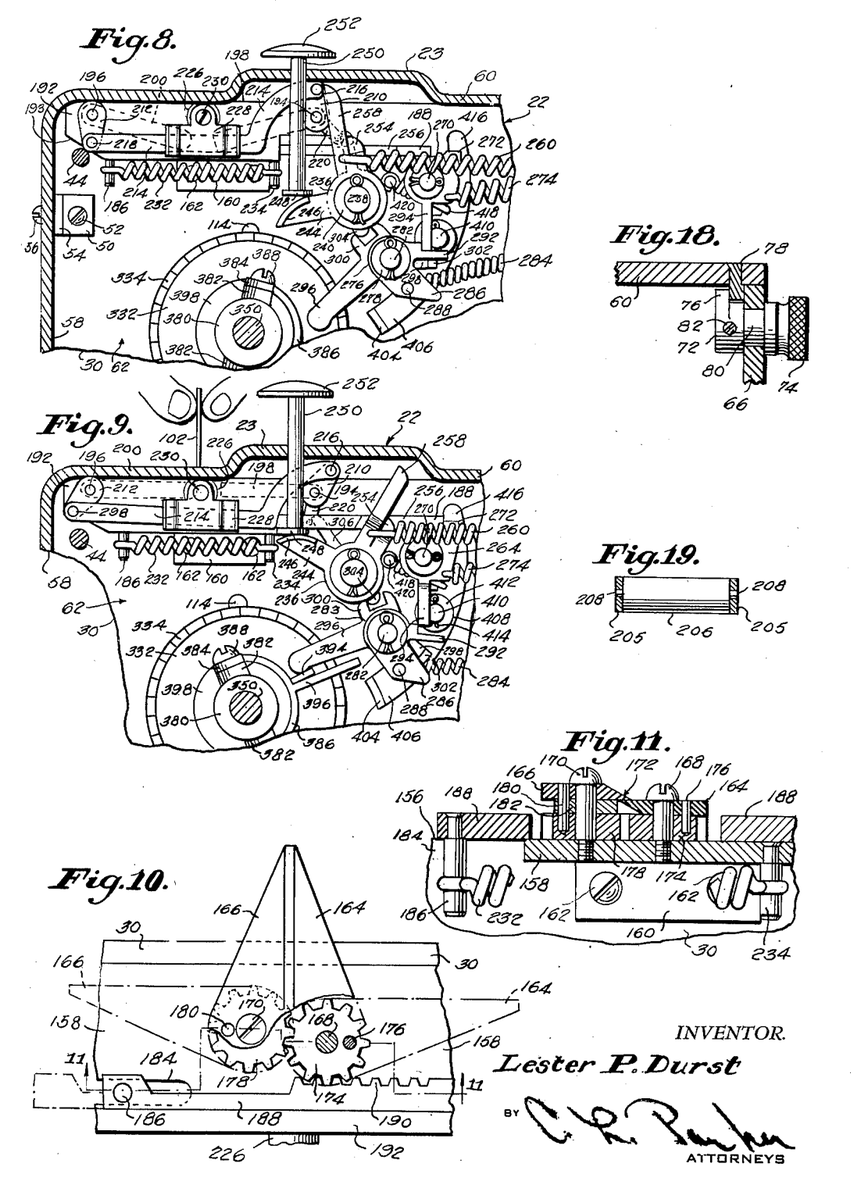
Fig. 8 is a fragmentary longitudinal cross-sectional view similar to Fig. 5 but illustrating the working parts of the machine in another operating position.
Fig. 9 is a fragmentary cross-sectional view similar to Fig. 8 but illustrating the parts in still another operating position.
Fig. 10 is a detailed top plan view to an enlarged scale of the shear mechanism shown in Fig. 6, portions of the structure being broken away to show the interior construction.
Fig. 11 is a longitudinal cross-sectional view through the shear mechanism taken substantially along the line 11—11 of Fig. 10.
Fig. 18 is a fragmentary detail view to an enlarged scale illustrating the latch means shown in Fig. 7.
Fig. 19 is a transverse view partially in cross section illustrating a detail of the guard device and taken substantially along the line 19—19 of Fig. 1.

The construction of this latch is illustrated in detail in Fig. 18, wherein it will be noted that the bolt 72 is preferably formed as a separate element and is attached to the rotatable shaft 80 of the latch as by means of a set screw 82. The compartment 64 contains part of the tape feeding apparatus as well as the roll of adhesive tape to be dispensed and it will be apparent that the closure 66 upon actuation of the latch-operating handle 74 may be swung open about its pivots 68, 70 to the dotted line position of Fig. 7 in order to provide access to the compartment 64 for the purpose of renewing the tape roll or making any necessary adjustments or the like. It will be noted from the description thus far that the housing 22 is divided into two separate compartments 62 and 64, each of which is substantially completely closed in such manner that the operating mechanism of the dispenser is largely separated from the roll of tape so that it is not necessary to open up the mechanism each time the tape roll is renewed, which would admit dust or other foreign particles into the mechanism, while at the same time the tape roll is adequately enclosed to prevent substantial drying out or other deterioration.

Figure 14:
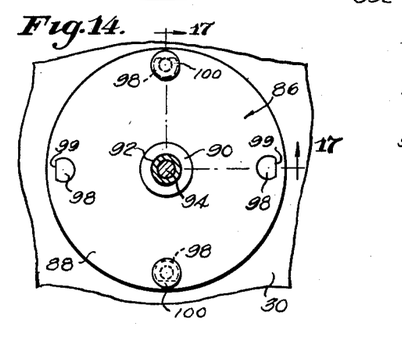
Fig. 14 is a fragmentary detail elevational view of the tape supporting reel illustrated in Fig. 4.
Figure 17:
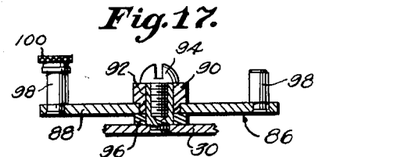
Fig. 17 is a cross-sectional view through the reel and supporting structure taken substantially along the line 17—17 of Fig. 14.
Figure 20:
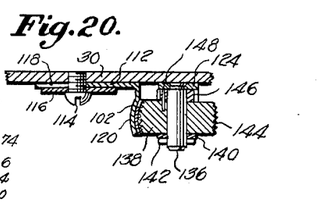
Fig. 20 is a transverse cross-sectional view through a portion of the feeding apparatus taken substantially along the line 20—20 of Fig. 4.

That portion of the dispenser which I have chosen to refer to generally as the tape feeding apparatus is perhaps best illustrated in Figs. 4, 7 and 20. Referring particularly to Fig. 4, an ordinary conventional roll of pressure-sensitive adhesive tape 84 wound upon a narrow cylindrical backing 85 of cardboard or the like is shown in its operative position mounted for rotation in a vertical plane upon a reel designated generally by reference numeral 86. As shown particularly in Figs. 14 and 17 the reel 86 comprises a circular disc 88 rotatably mounted by means of a central aperture upon the reduced inner shoulder of a bushing 90. The bushing 90 in turn is mounted upon a stub shaft or spindle 92 in any suitable manner as by means of a set screw 94, the spindle 92 being suitably secured in any convenient manner as by riveting, staking or the like to the inner wall 30 and the disc 88 being spaced from the inner wall as by means of a washer 96 surrounding the spindle 92 and abutting the inner reduced portion of the bushing 90. At suitably spaced points about its periphery the disc 88 is provided with a plurality of projecting fingers 98 attached thereto as by riveting or the like and shown in the present case as comprising four in number. The fingers 98 are provided with a generally flattened portion 99 at their radially outward faces for engagement with the inner face of the tape roll backing cylinder 85 and preferably at least two of the fingers 98 are provided with internally threaded bores to receive set screws having enlarged knurled heads 100 adapted to engage the outer edge of the tape roll 84 to hold the latter in position upon the reel.

The free end of tape 102 of the tape roll 84 is led from the reel 86 in a generally horizontal direction to an idler wheel 104 mounted for rotation in a vertical plane upon the inner wall 30 in any convenient manner as by means of a stub shaft 106 secured in the wall 30 and a washer 108 held in place by means of a cotter pin 110. The free end of the tape 102 is led around the idler wheel 104 and thence upwardly to a generally vertical guide plate 112 adjustably mounted within the compartment 64. As shown particularly in Figs. 4 and 20, the guide plate 112 is of generally angular shape having its flat side attached to the inner wall 30 by means of a machine screw 114 and washer 116, the screw 114 extending through a notch 118 so that the position of the guide plate may be adjusted relative to the idler wheel 104. The other face of the guide plate 112 as shown in Fig. 20 is provided with a transversely concave surface 120 extending upwardly from a point just above the idler wheel 104 and adapted to engage in sliding contact the back or nonadhesive face of the free tape end 102.

Referring once again to Figs. 4 and 20, the tape feeding apparatus also includes means for engaging the adhesive face of the free tape end to hold the nonadhesive face thereof in contact with the guide plate 112 and to impart a transverse curvature to the tape to improve the shearing operation by increasing the rigidity thereof. As shown in these figures, this means comprises an arm 124 pivotally mounted at one end 126 for free rotation upon a bolt 128, the latter being secured in any convenient manner in the inner wall 30. A suitable tension spring 130 attached at one end to a screw 132 secured to the inner wall 30 and at its opposite end to a pin 134 mounted upon the arm 124 constantly urges the arm 124 in a counterclockwise direction tending to move its free end towards the curved face 120 of the guide plate 112. At its free end the arm 124 is provided with a stub shaft 136 suitably attached thereto as by riveting or the like upon which is rotatably mounted a guide wheel 138 held in place as by means of a washer 140 and cotter pin 142. The guide wheel 138 is provided with a transversely convex periphery adapted to conform to the concave face 120 of the guide plate 112 and is serrated to provide a plurality of radially extending teeth indicated by reference numeral 144 to prevent undue sticking between the wheel 138 and the adhesive face of the tape end 102 at their region of contact.

The guide wheel 138 is also provided with suitable means to insure unidirectional rotation thereof during feeding of the tape in order to prevent any backlash and as shown in Figs. 4 and 20, such means comprises a ratchet wheel 146 secured to the wheel 138 as by means of one or more pins 148 and adapted to engage one end of a pawl 150. The pawl 150 is rotatably mounted upon a pin 152 on the arm 124 and is urged against the teeth of the ratchet wheel 146 by the pressure of a spring 153 firmly attached to the pawl 150 and having its opposite end tensioned against a suitable pin 154 also mounted on the arm 124. It will be apparent that as the free end 102 of the tape is manually pulled upwardly, the guide wheel 144 will press the tape against the curved face 120 of the guide plate 112 in such manner as to cause the tape to be curved transversely to conform to the mating curved surfaces of the wheel and plate, the wheel 144 rotating freely in one direction during such feeding operation. When it is desired to replace the tape roll 84, the arm 124 may be swung in a clockwise direction to move the wheel 144 away from the plate 112, thus permitting the free end of the tape 102 to be properly threaded in feeding position.

The means for shearing the free end of the tape 102 after the desired length has been withdrawn from the dispenser is best illustrated in Figs. 4, 5, 6, 10 and 11. Referring particularly to Figs. 4 and 5, it will be noted that the top edge of the inner wall 30 has been suitably cut away adjacent one corner to form a relatively large rectangular opening 156. A horizontal plate 158 is attached to the inner wall 30 by means of a downwardly angled portion 160 held in place by means of suitable screws 162 in such manner that the top surface of the horizontal plate 158 is approximately even with the bottom edge of the opening 156. A pair of cooperating shear blades 164 and 166 are pivotally mounted upon the plate 158 as by means of a pair of bolts 168 and 170 suitably threaded into the latter in such manner that the sharpened edges of the blades 164 and 166 slightly overlap as indicated by reference numeral 172 in Fig. 11 when the blades are in closed position. The shear blade 164 is provided with a spur gear 174 securely attached for joint rotation therewith as by means of a pin 176. In similar manner the shear blade 166 is likewise provided with a spur gear 178 secured for joint rotation thereto as by means of a pin 180. A suitable washer 182 is provided between the spur gear 178 and the blade 166 to properly space the latter one blade thickness higher than the blade 164 in order that the blades may properly cooperate to perform a shearing operation.

It will be noted in Fig. 10, wherein the shear blades are shown in open position in dotted lines, that the axes of the spur gears 174 and 178 are slightly displaced laterally of the plate 158 as well as longitudinally thereof in order that only the spur gear 174 may be engaged by the shear driving mechanism, the spur gear 178 being in engagement with and driven by the gear 174. As shown particularly in Figs. 6 and 10, there is provided an elongated through slot 184 adjacent one corner of the horizontal plate 158 through which extends a vertical pin 186 attached to one end of a rack bar 188 having teeth 190 along a portion of one edge in engagement with the teeth on the spur gear 174 for driving the latter to effect a shearing operation. The operation of the rack bar 188 will be hereinafter more fully described.

Figure 1:
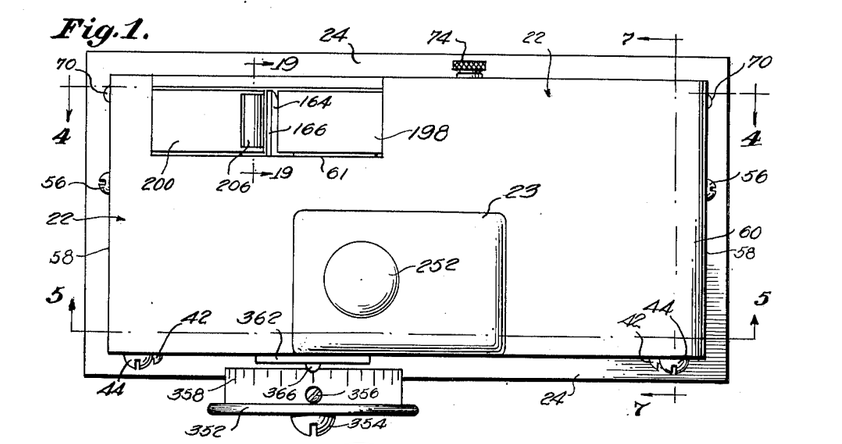
Fig. 1 is a top plan view of a preferred form of a dispensing machine in accordance with the present invention.
Figures 2, 3:
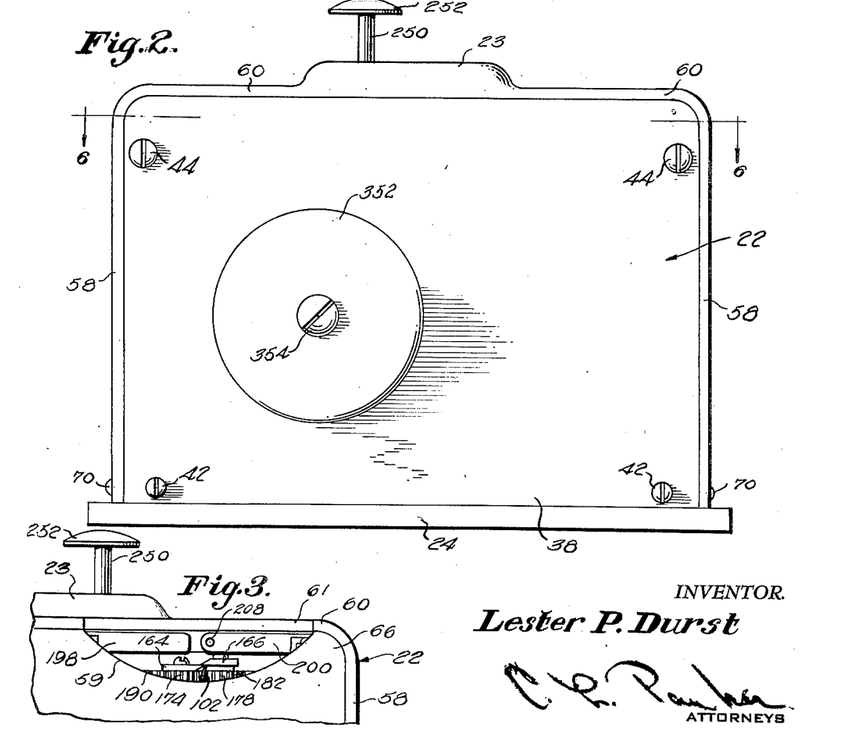
Fig. 2 is a front elevational view of the machine of Fig. 1.
Fig. 3 is a fragmentary rear elevational view showing an upper rear corner of the machine of Fig. 1.

Referring once more to Figs. 4, 5 and 6 and also to Figs. 1 and 3, I have provided as part of my improved dispenser a guard mechanism for preventing accidental injury to the operator of the machine as well as to prevent premature operation of the shearing device. As shown particularly in Figs. 5 and 6, the horizontal plate 158 is provided along its longitudinal edge remote from the downwardly turned bracket 160 with an upwardly turned portion forming a substantially vertical wall 192, one of the lower corners of which is beveled as at 193 in such manner as to rest against one of the through bolts 44 and the top of which is suitably shaped to conform to the inner surface of the top 60 of the housing. Aligned pairs of openings are formed in the wall 30 and plate 192 adjacent opposite ends of the latter within which are journaled a pair of shafts 194 and 196 having substantial portions projecting beyond the wall 30 and into the compartment 64. A pair of guard elements 198 and 200 are suitably mounted in any convenient manner as by means of the pins 202 and 204 upon the projecting portions of the shafts 194 and 196, respectively, and are preferably formed as metal stampings having their peripheral edges turned downwardly to form inverted channel-shaped sections. The guard elements 198 and 200 are shown in detail in Figure 21. The guard element 200 is provided at its free end with a cut-away portion in its top surface within which is mounted a roller 206 journaled between the projecting sides 205 of the guard upon a pair of pins 208 as illustrated in detail in Fig. 19. The roller 206 serves to guide the free end 102 of the tape as it is withdrawn from the dispenser between the guard elements.

The opposite ends of the shafts 194 and 196 also project a slight distance beyond the plate 192 and are provided at these projecting ends with oppositely extending crank arms 210 and 212, the former extending in an upward direction and the latter in a downward direction and the two being interconnected for joint opposite rotation by means of a curved tie plate 214 journaled respectively on the crank pins 216 and 218 of the arms 210 and 212. The shaft 194 is also provided with a downwardly projecting crank arm 220 lying between the walls 192 and 30 adjacent the latter and secured to the shaft as by means of a pin 222. The free end of the downwardly projecting crank arm 220 is provided with a crank pin 224 for a purpose which will hereinafter be more fully explained. A boss 226 projects outwardly from the wall 192 and is provided at its outer end with a spring 228 attached thereto in any convenient manner as by means of a screw 230. The ends of the spring 228 bear against the outer face of the tie plate 214 in such manner as to frictionally hold the latter against any unintentional movement, thus serving to immobilize the guard elements 198 and 200 except when the latter are positively actuated by a mechanism to be described below.

The mechanism thus far described comprises the structure of the housing proper, the apparatus for feeding the tape during dispensing, and the shearing device with its associated guards for safely performing the shearing operation after a predetermined length of tape has been withdrawn from the dispenser. It should now be apparent that the dispensing operation is intended to be accomplished manually by grasping the free end of the tape and pulling it through the feeding apparatus until it is severed by the shears. In order that this operation may be accomplished with facility the top 60 of the housing 22 is cut away to provide a rectangular aperture designated by reference numeral 61 in Fig. 1 overlying the region of the guards 198 and 200 and the shear blades 164 and 166 so that the operator may insert his fingers through the aperture 61 and past the guards to grasp the free end of the tape which is adjacent the notch 122 in the guide plate 112. It will be noted by referring to Fig. 3 that I have also provided a segmentary cut-away portion 59 in the upper edge of the closure member 66 and constituting a continuation of the aperture 61 for a like purpose. The means for operating the shears and the guards comprises a power-actuated mechanism including various cocking elements for presetting the shears in ready condition as well as a sear mechanism for releasing the cocked shear blades at the proper instant. As a part of the cocking and releasing operations, the guards are positively moved between blade obstructing and blade clear positions.

Referring now particularly to Figs. 5, 6 and 7, it will be noted that the pin 186 which projects downwardly from the rack bar 188 previously referred to is connected to one end of a relatively heavy tension spring 232 the other end of which is secured to a similar pin 234 rigidly attached to the plate 158 so that the rack bar 188 is constantly urged toward the right in Fig. 5 to tend to close the shear blades 164 and 166 together. In order to move the rack bar 188 to the left against the tension of the spring 232 to open the shear blades 164 and 166 I have provided a compound lever 236 pivotally mounted upon a pin 238 as by means of a washer 240 and cotter pin 242, the pin 238 being threaded or otherwise securely engaged in the inner wall 30. One arm 244 of the compound lever 236 is provided with a laterally extending curved cam surface 246 adapted to be abutted by the head 248 of a plunger 250 which projects outwardly through the top 60 of the housing and is provided with a generally circular operating disc 252. A second arm 254 of the compound lever 236 is offset to lie in a different vertical plane from that containing the arm 244 and projects outwardly at substantially right angles to the latter in such manner as to be received within an elongated slot 256 formed adjacent the righthand end of the rack bar 188. A third arm 258 of the compound lever 236 also extends at approximately right angles to the arm 244 and is slightly offset to lie in a vertical plane which also contains the crank pin 216 for a reason which will hereinafter become apparent. A tension spring 260 is secured at one end to the arm 258 and at its other end to a pin 262 mounted in the inner wall 30 in such manner as to constantly urge the compound lever 236 to rotate in a clockwise direction as viewed in Fig. 5.

It will now be apparent that as the plunger 250 is depressed manually, the head 248 will engage the cam surface 246 of the arm 244, thus rotating the compound lever 236 in a counter-clockwise direction against the tension of spring 260 so that the arm 254 will abut against the lefthand edge of the slot 256, thus forcing the rack bar 188 to the left to open the shear blades 164 and 166. At the same time the arm 258 of the compound lever 236 will be rotated into position to abut the crank pin 216 on the crank arm 210, thus rotating the latter and its pivot shaft 194 in a counter-clockwise direction. In order to provide adequate room for the various movements of the arm 258 and the crank arm 210 and pin 216, the top 60 of the housing 22 is provided with an upwardly-dished portion designated by reference numeral 23. Such rotation of the shaft 194 causes the guard 198 to be moved downwardly or into open position and through the tie plate 214. The crank arm 212 is likewise caused to rotate but in a clockwise direction to similarly move the guard 200 in a downward direction. Thus at the limit of downward movement of the plunger 250 the compound lever 236 will have been rotated in a counter-clockwise direction sufficiently to have moved the rack bar 188 to its extreme lefthand position, thereby opening the shear blades 164 and 166 and at the same time the guards 198 and 200 will have been moved downwardly into open or blade obstructing position.

In order to hold the rack bar 188 in cocked position I have provided a sear assembly in the form of a lever 264 pivotally mounted as by means of a washer 266 and cotter pin 268 upon a pin 270 firmly secured in any convenient manner in the inner wall 30. The lever 264 is provided with a shouldered portion 272, the inclined cam face of which is adapted to engage the right-hand end of rack bar 188 to hold the latter in its left-hand or cocked position. A tension spring 274 is secured at one end to the lever 264 and at its opposite end to the pin 282, thus tending to cause the lever 264 to rotate in a counter-clockwise direction as viewed in Fig. 5 to cause the shoulder 272 to engage the end of the rack bar 188 and hold the latter in cocked position.

In order to hold the shoulder 272 in engagement with the rack bar 188, I have provided another lever 276 pivotally mounted as by means of a washer 278 and cotter pin 280 upon a pivot pin 282, the latter being firmly attached to the wall 30 in any convenient manner. A tension spring 284 is attached at one end to a downwardly extending arm 286 of the lever 276 as by means of a suitable pin 288 and is anchored at its other end to a suitable pin 290 secured in the inner wall 30 thus constantly tending to rotate the lever 276 in a counter-clockwise direction. The lever 276 is provided with another arm 292 extending substantially horizontally therefrom and provided with a shouldered portion at its outer extremity adapted to engage the lower end of an arm 294 projecting downwardly from the lever 264 in such manner as to hold the latter latched in its limit position of counter-clockwise rotation.

As shown in Figs. 5 and 6, I have also provided means for rotating the lever 276 in a clockwise direction to release the arm 294 from the shouldered arm 292 and thus permit the lever 264 to be rotated in a clockwise direction by the camming action of the rack bar 188 against the shouldered portion 272 to operate the shear blades. This release mechanism is illustrated as comprising another lever 283 mounted upon the pivot pin 282 and having three arms 296, 298 and 300. The arm 298 is provided with a laterally projecting portion 302 which lies between the arms 286 and 292 of the lever 276. It will thus be apparent that if the arm 296 is moved upwardly or in a clockwise direction, the arm 298 will also move in a clockwise direction, causing the laterally projecting portion 302 to engage the arm 286 moving the latter downwardly against the tension of spring 284 to initiate the shearing action referred to above. The mechanism for moving the arm 296 upwardly or in a clockwise direction will be hereinafter more fully described and comprises the adjustable tape measuring mechanism consituting an important part of my improved dispensing machine.

It will be noted that the arm 300 is bifurcated for rocking engagement with a lever arm 304 pivotally mounted for oscillation about the pivot pin 238. This last-mentioned lever arm is integral with an oppositely extending arm 306 adapted to engage the crank pin 224 of the crank arm 220. Thus when the arm 296 is moved by the tape measuring mechanism in a clockwise direction to initiate a shearing operation, the first movement causes the arm 304 to move in a counter-clockwise direction, thereby also moving arm 306 in a counter-clockwise direction to rotate the shaft 194 in a clockwise direction and thus raise both of the guards 198 and 200 into their closed or blade-clear position.

Figures 12, 13, 15, 16, 21:
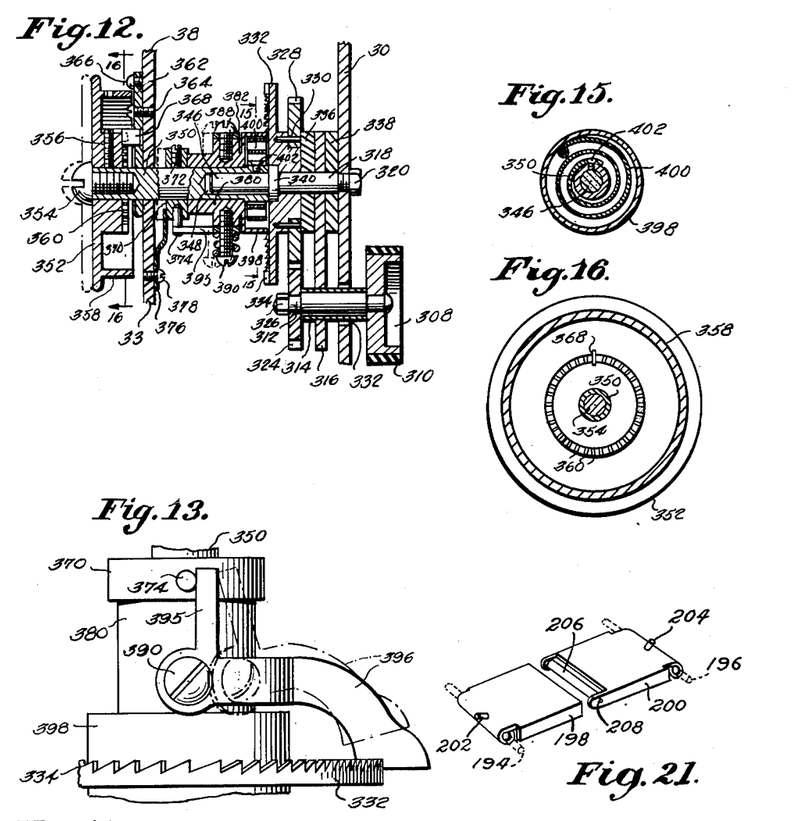
Fig. 12 is a detail transverse cross-sectional view through the tape measuring or indexing mechanism per se, constituting an important part of the present invention.
Fig. 13 is a fragmentary detail elevational view illustrating a portion of the tape measuring mechanism of Fig. 12 to an enlarged scale.
Fig. 15 is a transverse cross-sectional view through a portion of the tape measuring mechanism taken substantially along the line 15—15 of Fig. 12.
Fig. 16 is a transverse cross-sectional view through the indexing mechanism taken substantially along the line 16—16 of Fig. 12.
Figure 21 is a detail perspective of the blade guards.

The tape measuring mechanism which may be adjusted into various positions to release the sear assembly described above and thus cause the shear blades to perform a shearing operation at the desired time is best illustrated in Figs. 4, 5, 6, 7, 12, 13, 15 and 16. Referring now particularly to Figs. 4, 5 and 12, it will be noted that I have provided a contact wheel 308 having a relatively soft rubber or other tire 310 around its periphery adapted to frictionally engage the outer periphery of the tape roll 84 when in operative position and to be driven by the latter. The wheel 308 is rigidly connected to one end of a stub shaft 312 which is rotatably mounted within a bushing 314 carried at the lower end of a swinging arm 316. It will be noted that the wheel 308 is located within the compartment 64, whereas the swinging arm 316 is pivotally mounted within the compartment 62 upon an axle 318 secured in the inner wall 30 as by means of a suitable nut 320. In order to permit relatively free movement of the wheel 308 toward and away from the tape roll 84, the inner wall 30 is provided with an arcuate aperture 322 through which the shaft 312 and bushing 314 extend.

At its opposite end the stub shaft 312 carries a spur gear 324 rigidly held in place therein as by means of a nut 326 for joint rotation with the wheel 308 as the latter is driven by the tape roll 84. The spur gear 324 is in mesh with another gear 328 secured in any convenient manner as by means of pins 330 to a shouldered portion of a ratchet disc 332 having a plurality of evenly spaced teeth 334 along the peripheral edge of one of its faces and also pivotally mounted for rotation about the axle 318. As shown in Fig. 12 suitable washers 336 and 338 are inserted between the ratchet disc 332 and arm 316 and between the arm 316 and the wall 30, respectively, to provide proper alignment of the parts, and the assembly thus far described is held against axial displacement along the axle 318 by means of a shoulder 340 formed on the latter and engaged within a similarly shaped recess at the center of the ratchet disc 332. It will be noted in Fig. 5 that the wheel 308 is constantly urged against the tape roll 84 by means of a tension spring 342 connected at one end to the swinging arm 316 and suitably anchored at its opposite end to the inner wall 30 in any convenient manner as by means of the screw 344.

Referring now particularly to Fig. 12, it will be noted that the axle 318 is provided with a portion 346 extending axially beyond the shoulder 340 and ratchet disc 332 and slidably received within a counterbore 348 formed in the end of an index shaft 350. The index shaft 350 is rotatably mounted within a suitable aperture formed in the side wall 38 of the housing and carries at its outer end an index cylinder 352 held in place thereon as by means of a machine screw 354 and secured against rotation relative thereto in any convenient manner as by means of a set screw 356. The index cylinder 352 is provided with indicia on its outer periphery suitably graduated in increments of tape length as indicated generally by reference numeral 358 in Figs. 1, 6 and 7, and is also provided with a plurality of ratchet teeth 360 on its inner face preferably corresponding in number to the teeth 334 of the ratchet disc 332. The outer wall 38 of the housing adjacent the index cylinder 352 is provided with a marker plate 362 secured thereto in any convenient manner as by means of a screw 364, the plate 362 carrying an indicator 366 adapted to cooperate with the indicia 358 for visually determining various settings of the index cylinder 352 and also is provided with a lug 368 selectively engageable with the teeth 360. It will thus be apparent that the particular external indicia 358 upon the index cylinder 352 which is at any time opposite the indicator 366 will determine which of the teeth 360 is in engagement with lug 368.

Interiorly of the outer wall 38, the index shaft 350 is provided with a collar 370 held firmly in place thereon as by means of a set screw 372 and having a projecting radial lug 374 thereon. A leaf spring 376 attached to the inside of the outer wall 38 in any convenient manner as by means of a set screw 378 bears against the outer face of the collar 370 and urges the latter constantly toward the right in Fig. 12, thus serving to retain the index shaft 350 telescoped over the projecting portion 346 of the axle 318 and thereby maintaining the teeth 360 in engagement with the lug 368. It will be apparent that the index cylinder 352 may be set at any time by manually pulling it outward or to the left in Fig. 12, rotating it to the desired position, and releasing it at which time the spring 376 will force the index shaft and cylinder to the right to reengage the lug 368 with the newly selected one of the teeth 360.

Located just to the right of the collar 370 in Fig. 12 is a second and larger collar or spool 380 which is freely slidable axially of the index shaft 350. Intermediate its ends the spool 380 is provided with a pair of diametrically oppositely extending bosses 382 as shown most clearly in Fig. 5. The bosses 382 serve to pivotally mount the bifurcated ends 384 of a yoke 386, the ends 384 being held in place on one of the bosses by means of a screw 388 and upon the other boss by means of a screw 390 provided with a compression spring 392 constituting a firm frictional engagement between that particular end 384 and its associated boss 382 to prevent unintentional shifting or pivotal movement of the yoke 386. The yoke 386 (Figures 5 and 13) is also provided with a pair of circumferentially spaced arms 394 and 396 extending laterally therefrom and adapted to respectively engage the arm 296 of lever 263 and the teeth 334 of the ratchet disc 332. The yoke 386 is also provided with an arm 395 adapted in one position to abut the radial lug 374. At its extreme right-hand portion, as seen in Fig. 12, the spool 380 is also provided with an internal chamber or housing 398 in which is mounted a spiral coil spring 400 having its inner end secured to the index shaft 350 as by means of a set screw 402 and having its outer end attached in any convenient manner to the rim of the housing 398, thus serving to resiliently resist relative rotation between the spool 380 and the index shaft 350.

The edge of the arm 396 which is adapted to contact the teeth 334 of the ratchet disc 332 extends radially somewhat beyond these teeth as shown in Figs. 9 and 13 in position to be contacted by the inclined cam surface 404 formed on the upturned edge of the lower arm 406 of an arcuate lever 408. The lever 408 is pivotally mounted upon the inner wall 30 as by means of a pin 410 held in place by a suitable washer 412 and cotter pin 414 and is provided with an upwardly extending arm 416 lying in the path of the rack bar 188 and adapted to be engaged by the latter when in its extreme right-hand position to cause the cam surface 404 to engage the yoke arm 396 to disengage the latter from the teeth 334. The lever 408 is continuously urged in a counter-clockwise direction by means of a tension spring 418 attached at one end to the upper arm 416 of the lever and anchored at its opposite end to the inner wall 30 in any suitable manner as by means of a pin 420 so that the cam surface 404 is held out of operating range of the yoke arm 396 except when the lever 408 is rotated in a clockwise direction by engagement of the rack bar 188 with the upper arm 416.

*Operation*

The operation of the device may now be described as follows: In order to prepare the dispenser for operation the operator first opens the closure member 66 by rotating the knurled handle 74 to release the bolt 72 from its associated lug 78 so that the closure 66 may be pivoted outwardly upon the pins 70 thus providing access to the compartment 64. It is then possible to insert a fresh roll of adhesive tape 84 upon the reel 86 by unscrewing the knurled heads 100, placing the cylindrical backing 85 over the fingers 98, and repositioning the knurled heads 100 and setting them up firmly against the backing 85 to hold the roll 84 in place upon the reel. During this operation the wheel 308 is manually swung to the right in Fig. 4 away from the reel and tape roll, the arm 316 pivoting about the axle 318 against the tension of the spring 342. When the tape roll 84 is in place, the wheel 308 is released so that the tension of spring 342 may cause the rubber or other tire 310 to firmly engage the outer periphery of the tape roll 84.

The free end 102 of the tape is then led substantially horizontally away from the roll 84 and is guided around the idler wheel 104 and thence upwardly along the curved face 120 of the guide plate 112 to a position overlying the notch 122 such that it may be readily grasped by the operator upon inserting his fingers through the aperture 61. During this "threading" operation, the guide wheel 144 is moved to the right in Fig. 4 away from the guide plate 112 by swinging the arm 124 in a clockwise direction about its pivot 128 against the tension of the spring 130. After the free end 102 of the tape is in position on the curved surface 120, the arm 124 may be released to cause the guide wheel 144 to engage the adhesive surface of the tape, thus imparting to the latter a transversely curved configuration and holding it firmly in position. The closure 66 is then pivoted back into position to close the compartment 64 and the knurled handle 74 operated to reengage the bolt 72 with the lug 78.

In accordance with the normal procedure which will preferably be followed the operator next adjusts the tape measuring mechanism to determine the length of strip which he desires to dispense. This is accomplished by manually grasping the index cylinder 352, pulling it outwardly away from the housing 22 a short distance sufficient to disengage the teeth 360 from the lug 368 and rotating the cylinder 352 until the proper strip length as indicated by the indicia 358 registers opposite the indicator 366. At this time the cylinder 352 may be released so that it will automatically move inwardly (to the right in Fig. 12) to reengage the lug 368 with the newly selected tooth 360 under the tension of the spring 376 acting against the collar 370. It will also be noted as indicated by the dotted line showing in Fig. 12 that during this setting operation substantially the entire indexing mechanism including the index shaft 350, the collar 370, the spool 380 and its associated bosses 382 and yoke 386 as well as the housing 398 and spring 400 move with the index cylinder 352, the counterbore 348 of the index shaft 350 sliding freely around the extension 346 of the axle 318. Thus when the index cylinder 352 has been moved to its outer or left-hand position (dotted lines in Fig. 12) the arm 396 of the yoke 386 will be disengaged from the teeth 334 of the ratchet disc 332 and will be rotated simultaneously with the rotation of the cylinder 352 as the latter is moved to its new position of adjustment. When the cylinder 352 is released to reengage the lug 368 and the teeth 360, the arm 396 of the yoke 386 will also reengage a different tooth 334 on the ratchet disc 332. It is to be particularly noted that the number of teeth 334 upon the ratchet disc 332 correspond preferably exactly in number with the teeth 360 on the inner face of the index cylinder 352 so that for every position of adjustment of the cylinder 352 the arm 396 of the yoke 386 is initially set into a corresponding different position of engagement with the teeth 334 on the ratchet disc 332. During this setting operation there is of course no tensioning of the spring 400 since the spring and its housing move freely and simultaneously with the index shaft 350.

After the index cylinder has been properly adjusted to the desired strip length, the next operation is preferably that of manually cocking the shear actuating mechanism to condition it for the automatic performance of a shearing operation. Referring particularly to Fig. 5, the cocking mechanism is illustrated in its rest or uncocked position prior to any actuation of the parts. The cocking operation is accomplished by manually pressing downwardly upon the disc 252 to force the plunger 250 and its head 248 against the cam surface 246 at the outer end of the arm 244 of the compound lever 236. Such operation of the plunger 250 causes the compound lever 236 to be rotated in a counter-clockwise direction as viewed in Fig. 5 against the tension of the spring 260 causing the offset arm 254 to engage the end of the slot 256 in the rack bar 188 and move the latter to the left. As the rack bar 188 moves to the left, it slides along the inner face of the vertical wall 192, the teeth 190 meshing with the spur gear 174 and the latter meshing with the spur gear 178 in such manner as to cause the shear blades 164 and 166 to be swung into their open or cocked position or from the full line to the dotted line position as illustrated in Fig. 10. During this movement of the rack bar 188 the depending pin 186 slides to the left within the slot 184, thus serving to tension the spring 232 against its fixed anchor 234. It will thus be apparent that the spring 232 is actually the operating spring or power source for operating the shear blades 164 and 166 to cause a shearing operation of the latter by pulling the pin 186 and rack bar 188 to the right at the proper time thereby driving the intermeshed gears 174 and 178. The relative positions of the parts after the cocking operation just described are illustrated in Fig. 8.

Upon completion of the manual cocking operation I have provided means in the form of a sear assembly and associated parts for retaining the above described shear actuating elements in the cocked condition. Thus when the rack bar 188 has been moved substantially completely to the left into its cocked limit position, its right-hand end will have moved sufficiently to clear the shouldered portion 272 of the lever 264 which will then be moved in a counter-clockwise direction about its pivot 270 under the impetus of the tension spring 274 reacting against its fixed anchor 262 so that the inclined cam face of the shoulder 272 will prevent return movement of the rack bar 188 to the right. As the lever 264 rotates in a counter-clockwise direction, its arm 294 will move to the right from its position in Fig. 5 sufficiently to clear the shouldered portion of the arm 292 of lever 276. The lever 276 will then be free to pivot upwardly or in a counter-clockwise direction about its pivot 282 under the impetus of the tension spring 284 reacting between the fixed anchor 290 and the movable pin 288 to cause the shouldered portion of the arm 292 to engage the end of arm 294 in the manner shown in Fig. 8. Since the lever 276 is held in its new position by the spring 284, the arm 294 of lever 264 will likewise be held in its new position in engagement with the substantially vertical shoulder on arm 292, thereby retaining the inclined shouldered portion 272 in its new position obstructing the return of the rack bar 188. It should be particularly noted here that while I have provided an inclined surface on the shouldered portion 272 of lever 264 so that the rack bar 188 may at the proper time produce a camming action thereagainst, there is no such camming action between the shouldered portion 292 of the lever 276 and the lower arm 294 of the lever 264 so that the latter will not tend to become disengaged without the application of an independent disturbing force.

The disturbing force for effecting release of the arm 294 from the shouldered portion of arm 292 to permit the return of rack bar 188 to the right to perform a shearing operation is produced by means of the lever 283 which may be caused to rotate in a clockwise direction about its pivot 282 to engage the laterally offset abutment 302 of its arm 298 with the arm 286 of lever 276 to also rotate the latter in a clockwise direction against the tension of spring 284. Such clockwise rotation of lever 283 is produced by engagement of its arm 296 with the arm 394 of the yoke 386 which is caused to rotate in a counter-clockwise direction from its position shown in Fig. 5 to that illustrated in Fig. 9 by the operation of manually pulling the free end 102 of the tape from the dispenser. As the tape is withdrawn through the aperture 61, the tape roll 84 will be rotated thus driving the wheel 308 by engagement with the rubber tire 310 on the latter. The wheel 308 is drivingly connected to the spur gear 324 which thus in turn drives its interengaged gear 328 and thereby the index disc 332. It will be recalled that the arm 396 of the yoke 386 was initially set into a selected position in engagement with the teeth 334 of the index disc 332 so that as the latter is rotated by the feeding of the tape the yoke 386 will likewise be rotated (in a counter-clockwise direction in Fig. 5) to thereby also rotate the spool 380 on which it is mounted as well as the housing 398. However, during the rotation of the spool 380 and housing 398, the index shaft 350 is held against rotation by engagement of the lug 368 with the teeth 360 so that the shaft 350 together with the collar 370 and lug 374 are immobilized. Thus, as the housing 398 rotates, the spring 400 will be tensioned between its points of connection to the index shaft 350 and housing 398 in such manner as to tend to cause relative rotation therebetween.

After a sufficient length of tape has been withdrawn from the dispenser, that is, an amount as determined by the initial setting of the index cylinder 352, the arm 394 of the yoke 386 will contact the arm 296 of lever 283 and move the latter to the position shown in Fig. 9 in such manner as to release the sear assembly described above and permit the rack bar 188 to move to the right under the impetus of spring 232 to effect a shearing operation. At the completion of this shearing operation during the final states of movement of the rack bar 188 to its extreme righthand position, the rack bar 188 contacts the upper arm 416 of the lever 408, causing the latter to rotate in a clockwise direction about its pivot 410 to thereby swing its lower arm 406 to the left (Fig. 9). As the lower arm 406 swings to the left, the offset cam surface 404 contacts the projecting end of the arm 396 of yoke 386, thereby forcing the arm 396 outwardly to the position indicated in dotted lines in Fig. 13 when it will be out of engagement with the teeth 334 of the ratchet disc 332. As soon as this disengagement of the arm 396 from the ratchet disc 332 has been effected, the spiral spring 400 which has been tensioned by the withdrawing operation will immediately cause the spool 380, together with the housing 398 and yoke 386 to rotate in retrograde movement or in a clockwise direction as viewed in Figs. 5, 8 and 9. At the limit of this retrograde rotation of the spool 380 the arm 395 of yoke 386 will be forced into contact with the lug 374 which is fixed in position on the collar 370 and is immobilized by engagement of the latter with the index shaft 350. Thus the final continued rotation of the collar 380 will, by engagement of the lug 374 and arm 395, cause the yoke 386 to be rotated about its pivots 388 and 390 in a clockwise direction as shown in Fig. 13, thereby causing the arm 396 to reengage the teeth 334 at a new position on the ratchet disc 332.

Reverting briefly to the initial cocking operation, it will be noted that as the plunger 250 is depressed from the position which it occupies in Fig. 5 to that illustrated in Fig. 8, causing the compound lever 236 to be rotated in a counter-clockwise direction about its pivot 238, the arm 258 is likewise rotated in a counter-clockwise direction in such manner as to contact the crank pin 216 as it approaches the end of its rotational movement. During the last stages of rotation of the lever 236, the crank pin 216 is thus pushed by the arm 258 to the left in Fig. 5, causing the crank arm 210 to rotate in a counter-clockwise direction about its pivot 194 and by means of the tie plate 214 simultaneously rotating the crank arm 212 in a clockwise direction about its pivot 196. Such rotation of the crank arms 210 and 212 serves to impart a similar rotation to the shafts 194 and 196 to which they are attached which in turn rotates the guards 198 and 200 inwardly or downwardly to the blade obstructing position shown in dotted lines in Fig. 8. While in this inward or downward position the guards 198 and 200 lie in the combined planes of operation of the shear blades 164 and 166 which at this time are open and cannot be closed either accidentally or intentionally until such time as the guards 198 and 200 have been returned to their upper or blade clear position.

In order to return the guards 198 and 200 to their upper or blade clear position I have provided the second crank arm 220 carrying at its free end the crank pin 224. During the tape dispensing operation as the free end of the tape is being manually withdrawn through the aperture 61, thus causing the yoke 386 to be rotated in a counter-clockwise direction as seen in Fig. 5, the arm 394 on the yoke 386 contacts the arm 296 on lever 283 a short time prior to the release of the sear assembly to effect a shearing operation, the actual time interval being determined by the permissible movement of the offset abutment 302 on arm 298 between the two arms 292 and 286 of the lever 276. Thus, during this initial movement of the arm 296 prior to release of the sear assembly the lever 283 is rotated in a clockwise direction causing the bifurcated arm 300 to move the arm 304 in a counter-clockwise direction about its pivot 238. Such movement of the arm 304 imparts a similar counter-clockwise movement to the arm 306 causing the latter to contact the crank pin 224 thus initiating a clockwise rotation of the shaft 194 and a simultaneous counter-clockwise rotation of the shaft 196 to return the guards 198 and 200 to their upper or blade clear position. It will thus be seen that due to the time lag in movement of the offset abutment 302 from the arm 292 to the arm 286 the mechanism just described is operative to positively raise the guards 198 and 200 prior to releasing the sear assembly to effect a shearing operation of the blades 164 and 166. In the time interval between movement of the guards 198 and 200 to blade obstructing and blade clear positions near the beginning and end, respectively, of a dispensing operation, the guards are frictionally held against undesirable displacement by means of the spring 228 which frictionally engages the tie plate 214 for this purpose.

Although I have described above a preferred sequence of steps in the performance of a complete dispensing operation, it will be apparent that the exact sequence may be varied, and in some cases desirably so, without affecting the accuracy of the operation. Thus, for example, the cocking of the shear blades may be effected prior to the initial adjustment of the index cylinder 352 inasmuch as these mechanisms are impositively connected so that the sear assembly will not be released in any event until the tape has been withdrawn to the desired extent. In similar manner the index cylinder 352 may be readjusted during a dispensing operation to provide for the dispensing of a shorter or longer strip so long as the tape withdrawal has not proceeded to such a point that such readjustment of the index cylinder will effect a release of the sear assembly. In either case such setting or readjustment of the index cylinder at an intermediate stage during tape withdrawal will not introduce any inaccuracy in the desired measurement, since reverse movement of the tape or backlash is prevented by the ratchet mechanism associated with the guide wheel 144 and permitting the latter to rotate only in the feeding direction.

While I have described in detail only a single preferred embodiment of this invention, it is to be clearly understood that numerous changes can be made in size, materials, and arrangement of parts without departing from the principles of the invention as set forth in the appended claims.

I claim:

1. A machine for dispensing measured strips from a continuous roll of tape comprising a housing having an aperture therein, apparatus in said housing for feeding said tape through said aperture, a pair of shear blades adjacent said aperture having intermeshed gears at one end for joint operation, a rack bar slidably mounted in said housing in mesh with one of said gears, spring means connected to said rack bar and tending to move the latter to close said shear blades, shear cocking means including a manually operable plunger projecting from said housing and operable to move said bar against the tension of said spring means to open said shear blades and a sear assembly cooperable with said rack bar for releasably holding said blades in open position, a pair of guards pivotally mounted at opposite ends of said aperture, link means interconnecting said guards for joint movement between blade-obstructing and blade-clear position including spring means resisting such movement, and an adjustable tape measuring mechanism in said housing having mechanical connection with said apparatus, said link means, and said assembly for moving said guards to blade-clear position and subsequently releasing said blades to cut said tape after a predetermined length has been withdrawn from said machine.

2. A machine for dispensing measured strips from a continuous roll of tape comprising apparatus for feeding said tape, a pair of shear blades having intermeshed gears at one end for joint operation, a slidably mounted rack bar in mesh with one of said gears, spring means connected to said rack bar and tending to move the latter to close said shear blades, shear cocking means including a manually operable plunger operable to move said bar against the tension of said spring means to open said shear blades and a sear assembly cooperable with said rack bar for releasably holding said blades in open position, a pair of guards pivotally mounted adjacent said blades, link means interconnecting said guards for joint movement between blade-obstructing and blade-clear position, and an adjustable tape measuring mechanism having mechanical connection with said apparatus, said link means, and said assembly for moving said guards to blade-clear position and subsequently releasing said blades to cut said tape after a predetermined length has been withdrawn from said machine.

3. In a machine for dispensing measured strips from a continuous roll of tape, a tape shearing device, power means for actuating said device, a manually operable plunger for cocking said actuating means, a sear assembly operatively associated with said actuating means for releasably holding said device in cocked condition, a pair of guards pivotally mounted adjacent said device for movement into and out of position obstructing operation of the latter, link means interconnecting said guards for joint movement thereof, and an adjustable tape measuring mechanism having mechanical connection with said link means and said assembly for moving said guards out of obstructing position and subsequently releasing said device to cut said tape after a predetermined length has been withdrawn from said machine.

4. In a machine for dispensing measured strips from a continuous roll of tape, a tape shearing device, power means for actuating said device, a pair of guards pivotally mounted adjacent said device for movement into and out of position obstructing operation of the latter, link means interconnecting said guards for joint movement thereof, and an adjustable tape measuring mechanism having mechanical connection with said link means and said actuating means for moving said guards out of obstructing position and subsequently releasing said device to cut said tape after a predetermined length has been withdrawn from said machine.

5. In a machine provided with a shearing device for dispensing measured strips from a continuous roll of tape and including means for actuating said device, a guard mounted adjacent said device for movement into and out of position obstructing operation of the latter, and a tape measuring mechanism having mechanical connection with said guard and said actuating means for moving said guard out of obstructing position and initiating operation of said device to cut said tape after a predetermined length has been withdrawn from said machine.

6. In a machine for dispensing measured strips from a continuous roll of tape, means for shearing said tape, a guard mounted adjacent said shearing means for movement into and out of position obstructing operation of the latter, and a tape measuring mechanism having mechanical connection with said shearing means and said guard for moving the latter out of obstructing position prior to operation of said shearing means.

LESTER P. DURST.

REFERENCES CITED

The following references are of record in the file of this patent:

UNITED STATES PATENTS

| Number | Name | Date |
|---|---|---|
| Re. 22,981 | Fitch | Mar. 9, 1948 |
| 1,056,589 | Ryan | Mar. 18, 1913 |
| 1,447,735 | Simone | Mar. 6, 1923 |
| 1,484,598 | Weniger | Feb. 19, 1924 |
| 1,998,245 | Laukhuff | Apr. 16, 1935 |
| 2,088,256 | Seall | July 27, 1937 |
| 2,097,031 | Loewenberg | Oct. 26, 1937 |
| 2,158,790 | Arthur | May 16, 1939 |
| 2,245,472 | Goldstein | June 10, 1941 |
| 2,291,668 | Weigolt | Aug. 4, 1942 |
| 2,345,373 | Ayers | Mar. 28, 1944 |
| 2,379,033 | Olsson | June 26, 1945 |
| 2,382,406 | Engberg | Aug. 14, 1945 |
| 2,382,787 | Gautier | Aug. 14, 1945 |